US011521077B1

(12) United States Patent
Kapoor et al.

(10) Patent No.: US 11,521,077 B1
(45) Date of Patent: Dec. 6, 2022

(54) AUTOMATIC RECOMMENDATION OF PREDICTOR VARIABLE VALUES FOR IMPROVING PREDICTIVE OUTCOMES

(71) Applicant: Numerify, Inc., San Jose, CA (US)

(72) Inventors: Rahul Kapoor, Bellevue, WA (US); Shalini Sinha, Bengaluru (IN); Ravi Kumar, Bengaluru (IN)

(73) Assignee: Digital.ai Software, Inc., Burlington, MA (US)

( * ) Notice: Subject to any disclaimer, the term of this patent is extended or adjusted under 35 U.S.C. 154(b) by 861 days.

(21) Appl. No.: 16/273,127

(22) Filed: Feb. 11, 2019

(51) Int. Cl.
*G06N 20/00* (2019.01)
*G06N 5/00* (2006.01)

(52) U.S. Cl.
CPC .............. *G06N 5/003* (2013.01); *G06N 20/00* (2019.01)

(58) Field of Classification Search
CPC ................................ G06N 5/003; G06N 20/00
See application file for complete search history.

(56) References Cited

U.S. PATENT DOCUMENTS

| 7,987,159 | B2 | 7/2011 | Gopal et al. | |
|---|---|---|---|---|
| 8,417,715 | B1 * | 4/2013 | Bruckhaus | G06Q 10/04 |
| | | | | 705/26.1 |
| 9,922,104 | B1 | 3/2018 | Kapoor et al. | |
| 10,049,142 | B1 | 8/2018 | Kapoor et al. | |
| 10,366,346 | B2 * | 7/2019 | Achin | G06N 20/00 |
| 2005/0234688 | A1 * | 10/2005 | Pinto | G05B 17/02 |
| | | | | 703/13 |
| 2015/0088606 | A1 * | 3/2015 | Tyagi | G06Q 30/0202 |
| | | | | 705/7.31 |
| 2018/0268291 | A1 * | 9/2018 | Turner | G06N 3/088 |
| 2020/0241490 | A1 * | 7/2020 | Jermann | G07C 3/00 |

* cited by examiner

*Primary Examiner* — Michael J Huntley
*Assistant Examiner* — Adam C Standke
(74) *Attorney, Agent, or Firm* — Rahman LLC

(57) ABSTRACT

An automated system for recommending predictor variable values for improving predictive outcomes of a predictive model is provided. The automated system recommends appropriate predictor variable values for changeable predictor variables that improve a predictive outcome of the predictive model by (i) computing predictive outcomes for each input record during a batch ETL process and (ii) determining appropriate predictor variable values that lead to improved predictive outcomes, using the code generated extended ETL jobs updated to perform rescoring using a combination of different values of the changeable predictor variables while honoring constraints between the changeable predictor variables, or by enabling an end user to perform said rescoring by changing values of the changeable predictor variables on the fly to determine most suitable predictor variable values that lead to improved predictive outcomes.

21 Claims, 9 Drawing Sheets

| Change Number | Short Description | Risk Level (Failure Probability) | Change Risk Factors ||||| 
| | | | Type | Impact | CI Class | Start Time | Assignment Group |
| --- | --- | --- | --- | --- | --- | --- | --- |
| CHG02377 | SAP Finance Release | Low (< 5%) | Normal *Low* | Medium *Low-Med* | Application *Low* | 7 pm *Low* | ADS-SAP *Low-Med* |
| CHG02325 | Oracle Security Patch | Low-Med (5 – 25%) | Emergency *Low-Med* | High *Low* | Oracle Server *High* | 8 pm *Low* | INFOSEC-ORACLE *Low* |
| CHG02421 | CISCO Upgrade | Med-High (25 – 50%) | Standard *Low-Med* | High *Low* | Network Gear *High* | 5 am *High* | EMEA-NET-ENG *High* |
| CHG02365 | VMWare Maintenance | High (> 50%) | Standard *Low-Med* | Low *High* | Linux Server *Low-Med* | 4 am *High* | INF-MIDRNG *Low-Med* |

Note: The bucketing of individual predictor variable values is indicated in *Italics* in the table

FIG. 1B

AUTOMATIC RECOMMENDATION OF PREDICTOR VARIABLE VALUES FOR IMPROVING PREDICTIVE OUTCOMES

BACKGROUND

Technical Field

The embodiments herein generally relate to predictive analysis, and more specifically to a system and method for automatically recommending predictor variable values for improving predictive outcomes of a predictive model.

Description of the Related Art

A predictive model includes many input variables as selected by data scientists developing the model. Typically, data scientists look at the data source, analyze the data, determine the right variables to pick, and select the best algorithm to use. Automated aids may be used to select predictor variables as described in U.S. patent application Ser. No. 15/992,992 entitled "Aids for porting predictive models across tenants and handling impact of source changes on predictive models," the complete disclosure of which in its entirety is incorporated herein by reference, for analyzing the data sources to yield recommendations on what should be the input variables for generating the predictive model. Once the predictive variables are finalized, and models are created, the predictions for a record are based on the values for the predictive variables in the record and the model. However, after looking at the predictions and the values of the variables used to arrive at the predictions, end business intelligence (BI) users may still want to understand how the predicted value changes for different variable values, or they may want to see predicted value by just a subset of the selected variables, or identify the contribution of a particular variable to the predicted value.

Further, the predictive models may perform predictions using predictor variables which indicate failure of the predicted outcomes with the given set of predictor variable values. However, a different combination of predictor variable values may provide improved predictive outcome for the prebuild model. But, finding the best combination of predictor variable values for the prebuild model is very cumbersome and time-consuming process for data scientist. None of the existing systems provides aids to the end BI users to find the best combination of predictor variable values for improving predicted outcomes.

Accordingly, there remains a need for a system and method for recommending appropriate predictor variable values for improving predictive outcomes of a predictive/prebuilt model such as one for improving accuracy of change failure prediction probability in IT Service Management (ITSM) systems that run a predictive model to predict change failures. Changes are created to solve Incidents which are an unplanned interruption of a service and Problems which are root cause of the Incidents, but Changes might lead to failure and causes new Incidents and it is important to minimize the risk of Changes failing. Hence, there is a need for predicting change failure probability and recommending suitable predictor variable values that would minimize the change failure probability. For example, the recommended predictor variable values may imply that the end user should reschedule or reassign the change to minimize the risk of Change failure.

SUMMARY

In view of the foregoing, an embodiment herein provides an automated system for recommending predictor variable values for improving predictive outcomes of a predictive model. The automated system includes a memory and a processor. The memory stores a set of instructions. The processor executes the set of instructions and is configured to (i) obtain customer inputs on the predictive model variables including a list of predictor variables that are changeable and data constraints between the changeable predictor variables, (ii) code generate extended extract, transform, load (ETL) jobs, using a code generation process, to incorporate scoring for an input record using the predictive model, (iii) rescore, using the predictive model, a plurality of predictive outcomes for the input record by using a combination of different values of the changeable predictor variables while honoring constraints between the changeable predictor variables, (iv) selectively categorize the values of the changeable predictor variables into a plurality of buckets matching the predicted variable buckets based on the plurality of predictive outcomes to reduce a number of value combinations to be tried by analyzing only one value per bucket instead of trying every possible value for efficiency in coming up with predictor variable values for an improved predictive outcome and (v) automatically recommend appropriate predictor variable values for the changeable predictor variables for improving a predictive outcome by computing predictive outcomes for each input record during a batch ETL process and determining appropriate predictor variable values that lead to improved predictive outcomes, using the code generated extended ETL jobs updated to perform said rescoring, or enable an end user to perform said rescoring by changing values of the changeable predictor variables on the fly to determine most suitable predictor variable values that lead to improved predictive outcomes.

In an embodiment, the data constraints include dependencies between the changeable predictor variables.

In an embodiment, the source for the input records for scoring is provided as part of the code generated ETL jobs.

In another embodiment, the processor is configured to extend the code generated ETL tool with a Model Manager to capture metadata for generating the predictive model. The Model Manager is a computerized module to capture the predictive model metadata for building machine learning model and deploying the predictive model in production. The metadata includes a technical library on which the predictive model is to be created, training data on which the predictive model is to be trained, a machine learning algorithm that is used for generating the predictive model, hyperparameters and their values for the machine learning algorithm and algorithm scripts for customizing the predictive model.

In yet another embodiment, the processor is configured to (i) eliminate, on the fly, a negative changeable predictor variable that leads to a degradation of the predictive outcome, and (ii) rescore, using the predictive model, a new predictive outcome with safe values for the negative changeable predictor variable as an approximation to nullify the degradation of the predictive outcome due to that negative changeable predictor variable on the new predictive outcome. The safe values are predictor variable values in a bucket corresponding to the best predicted variable value bucket.

In yet another embodiment, the processor is configured to (i) pre-generate a plurality of predictive models with different combinations of the changeable predictor variables prior to scoring, and (ii) determine, from the plurality of predictive models, a matching predictive model if one exists after eliminating the negative changeable predictor variable, and rescore using the matched predictive model to obtain a new predictive outcome for the input record.

In another embodiment, the processor is configured to (i) determine, from the plurality of predictive models, a predictive model that includes a maximum number of predictor variables as provided in the customer inputs if the matching predictive model does not exist after eliminating the negative changeable predictor variable, and (ii) approximate, using the predictive model that includes a maximum number of predictor variables as provided in the customer inputs, by substituting the safe values for the negative changeable predictor variable and rescore on the fly, to obtain a new predictive outcome for the input record.

In yet another embodiment, the processor is configured to generate a new predictive model based on the metadata of a predictive model that includes a maximum number of predictor variables as provided in the customer inputs, if a matching predictive model does not exist after eliminating the negative changeable predictor variable, and rescore, using the new predictive model, to obtain a new predictive outcome for the input record.

In another embodiment, processor is configured to update a computer-generated electronic report or a dashboard in a computer user interface (UI) to include the predictive outcomes.

In yet another embodiment, the processor is configured to automatically update code generated extended ETL jobs to determine (i) a predictive model to be used for scoring, (ii) the data system from which the incremental data associated with the input record needs to be obtained, and (iii) data repository feeding reports and dashboards at which the predictive outcome has to be stored.

In yet another embodiment, the UI is configured to provide an interface to, (i) display the predictive outcome obtained by performing scoring analysis based on the predictor variables, (ii) display the predictor variables used for generating the predictive outcome with values that were used for scoring to obtain the predictive outcome, (iii) display a contribution percentage of the predictor variables to the predictive outcome, and (iv) enforce data security in a predictor variable value specification.

In yet another embodiment, the UI is further configured to provide a computerized conversational interface to (i) provide dropdown menu selections below the changeable predictor variables with a list of possible values and a data entry type-in option to enable a user to provide values for continuous predictor variables, (ii) provide a special dropdown value of Ignore below the changeable predictor variables to ignore a changeable predictor variable, (iii) display bucket categories below each changeable predictor variable, wherein values of each changeable predictor variables are selectively categorized into a plurality of buckets matching the predicted variable buckets based on the plurality of predictive outcomes to reduce a number of value combinations to be tried for recommending values for the predictor variables, (iv) enforce constraints across the changeable predictor variables so, when a value is selected for a set of changeable predictor variables, only values allowed based on the constraints are settable for other changeable predictor variables, (v) display a rescore button, when the end user selects a different value for the changeable predictor variable than that used in the current prediction and enable the end user to do rescoring, and (vi) display a rebuild and rescore button for rebuilding a new matching predictive model and rescoring using the new matching predictive model for improved analysis, when the rescore results are an approximation using a safe value substitution from a predictive model that comprises a maximum number of predictor variables as provided in the customer inputs, wherein the safe values are predictor variable values in a bucket corresponding to the best predicted variable value bucket.

In one aspect, a non-transitory computer readable storage medium storing a sequence of instructions, which when executed by a processor, performs a method for recommendation of predictor variable values for improving predictive outcomes of a predictive model is provided. The method includes (i) obtaining customer inputs on the predictive model variables comprising a list of predictor variables that are changeable and data constraints between the changeable predictor variables, (ii) code generating extended extract, transform, load (ETL) jobs, using a code generation process, to incorporate scoring for an input record using the predictive model, (iii) rescoring, using the predictive model, a plurality of predictive outcomes for the input record by using a combination of different values of the changeable predictor variables while honoring constraints between the changeable predictor variables, (iv) selectively categorizing the values of the changeable predictor variables into a plurality of buckets matching the predicted variable buckets based on the plurality of predictive outcomes to reduce a number of value combinations to be tried by analyzing only one value per bucket instead of trying every possible value for efficiency in coming up with predictor variable values for an improved predictive outcome, and (v) automatically recommending appropriate predictor variable values for the changeable predictor variables for improving a predictive outcome by computing predictive outcomes for each input record during a batch ETL process and determining appropriate predictor variable values that lead to improved predictive outcomes, using the code generated extended ETL jobs updated to perform said rescoring, or enabling an end user to perform said rescoring by changing values of the changeable predictor variables on the fly to determine most suitable predictor variable values that lead to improved predictive outcomes.

In an embodiment, the data constraints include dependencies between the changeable predictor variables.

In an embodiment, the source for the input records for scoring is provided as part of the code generated ETL jobs.

In another embodiment, the method includes the steps of extending the code generated ETL tool with a Model Manager to capture metadata for generating the predictive model. The Model Manager is a computerized module to capture the predictive model metadata for building machine learning models and deploying the predictive model in production. The metadata includes a technical library on which the predictive model is to be created, training data on which the predictive model is to be trained, a machine learning algorithm that is used for generating the predictive model, hyperparameters and their values for the machine learning algorithm and algorithm scripts for customizing the predictive model.

In yet another embodiment, the method further includes the step of (i) eliminating, on the fly, of a negative changeable predictor variable that leads to a degradation of the predictive outcome, and (ii) rescoring, using the predictive model, to generate a new predictive outcome with safe values for the negative changeable predictor variable as an approximation to nullify the degradation of the predictive outcome due to that negative changeable predictor variable on the new predictive outcome. The safe values are predictor variable values in a bucket corresponding to the best predicted variable value bucket.

In yet another embodiment, the method further includes the step of (i) pre-generating a plurality of predictive models with different combinations of the changeable predictor variables prior to scoring, and (ii) determining, from the plurality of predictive models, a matching predictive model if one exists after eliminating the negative changeable predictor variable, and rescoring using the matched predictive model to obtain a new predictive outcome for the input record.

In yet another embodiment, the method further includes the step of (i) determining, from the plurality of predictive models, a predictive model that comprises a maximum number of predictor variables as provided in the customer inputs if the matching predictive model does not exist after eliminating the negative changeable predictor variable, and (ii) approximating, using the predictive model that includes a maximum number of predictor variables as provided in the customer inputs, by substituting the safe values for the negative changeable predictor variable and rescoring on the fly, to obtain a new predictive outcome for the input record.

In yet another embodiment, the method further includes the step of generating a new predictive model based on the metadata of a predictive model that comprises a maximum number of predictor variables as provided in the customer inputs, if a matching predictive model does not exist after eliminating the negative changeable predictor variable, and rescoring, using the new predictive model, to obtain a new predictive outcome for the input record.

In yet another embodiment, the method further includes the step of updating a computer-generated electronic report or a dashboard in a computer user interface (UI) to include the predictive outcomes.

In yet another embodiment, the method further includes the step of automatically updating code generated extended ETL jobs to determine (i) a predictive model to be used for scoring, (ii) the data system from which the incremental data associated with the input record needs to be obtained, and (iii) data repository feeding reports and dashboards at which the predictive outcome has to be stored.

In yet another embodiment, the UI is configured to provide an interface to (i) display the predictive outcome, wherein the predicted outcome is obtained by performing scoring analysis based on the predictor variables, (ii) display the predictor variables used for generating the predictive outcome with values that were used for scoring to obtain the predictive outcome, (iii) display a contribution percentage of the predictor variables to the predictive outcome, and (iv) enforce data security in a predictor variable value specification.

In yet another embodiment, the UI is further configured to provide a computerized conversational interface to (i) provide dropdown menu selections below the changeable predictor variables with a list of possible values and a data entry type-in option to enable a user to provide values for continuous predictor variables, (ii) provide a special dropdown value of Ignore below the changeable predictor variables to ignore a changeable predictor variable, (iii) display bucket categories below each changeable predictor variable, wherein values of each changeable predictor variables are selectively categorized into a plurality of buckets matching the predicted variable buckets based on the plurality of predictive outcomes to reduce a number of value combinations to be tried for recommending values for the predictor variables, (iv) enforce constraints across the changeable predictor variables so, when a value is selected for a set of changeable predictor variables only values allowed based on the constraints are settable for other changeable predictor variables, (v) display a rescore button, when the end user selects a different value for the changeable predictor variable than that used in the current prediction and enable the user to do rescoring, and (vi) display a rebuild and rescore button for rebuilding a new matching predictive model and rescoring using the new matching predictive model for improved analysis, when the rescore results are an approximation using a safe value substitution from a predictive model that comprises a maximum number of predictor variables as provided in the customer inputs, wherein the safe values are predictor variable values in a bucket corresponding to the best predicted variable value bucket.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1B illustrates a table that shows some example change records scored using the predictive model as part of a batch scoring ETL process according to an embodiment herein;

DETAILED DESCRIPTION

Figure 1A:
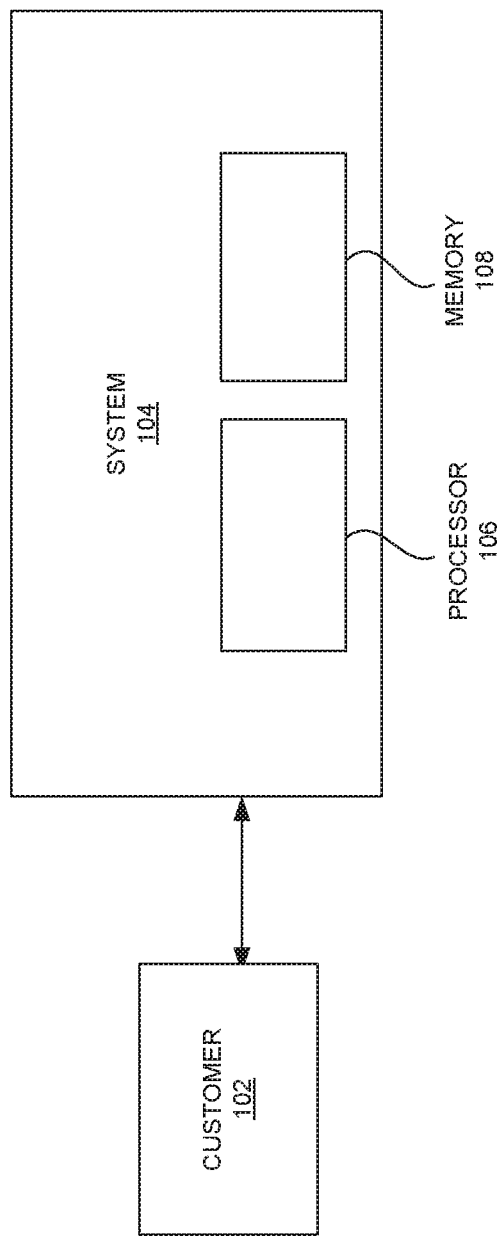
FIG. 1A is a system view illustrating a customer interacting with an automated system for recommending predictor variable values for improving predictive outcomes of a predictive model according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a system and a method for recommending predictor variable values for improving predictive outcomes of a predictive model. Referring now to the drawings, and more particularly to FIGS. 1A through 8, where similar reference characters denote corresponding features consistently throughout the figures, preferred embodiments are shown.

As used herein, several terms are defined below:

The term "Predictive Model" refers to a collection of computer-implemented processes that are applied on input records to predict outcomes.

The term "Predictor variable/predictive model variable" refers to a variable that is used in a predictive model to predict another variable.

The term "Predictor variable value" refers to a value that is assigned to a predictor variable.

The term "Metadata" refers to data that provides information about other data.

The term "ETL" short for Extract-Transform-Load refers to a computer-implemented procedure of extracting data in one form from a source, transforming the data into another form, and loading the transformed data into a warehouse or database. There are some solutions related to code generated ETL tools. For example, U.S. Pat. No. 10,049,142, entitled "Multi-step code generation for bi processes" describes the architecture for Multi-step code generation for BI processes.

The term "Predictive outcome" refers to computer-generated predictions for an outcome of future events obtained by analyzing current and historical facts using predictive models.

The term "Scoring" refers to a computer-implemented process of applying the predictive model on the values of model variables in input data records.

The term "Rescoring" refers to a computer-implemented process of repeating Scoring using a potentially different set of values for the model variables.

The term "Changeable predictor variable" refers to a predictor variable whose values can be changed in practice so it's actually useful to suggest values for such variables which lead to better outcomes. For variables whose values cannot be changed in practice, there is no point in suggesting different values.

The term "Rescoring analysis" refers to a computer-implemented process of changing the value of the predictor variable to see how changing the value affects the predictive outcome.

The term "on the fly" refers to a computer-implemented process of performing changes in real time.

The term "Batch scoring" refers to a computer-implemented process of Scoring using the predictive model in a batch job.

In an exemplary embodiment, the various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such as an Oracle® relational databases), the data objects can be configured as a table or column. Other configurations include specialized objects, distributed objects, object oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

FIG. 1 is a system view illustrating a customer 102 interacting with an automated system 104 for recommending predictor variable values for improving predictive outcomes of a predictive model according to an embodiment herein. The automated system 104 further includes a memory 108 that stores a set of instructions and a processor 106 that is configured to execute the set of instructions. The automated system 104 obtains customer inputs on the predictive model variables comprising a list of predictor variables that are changeable and data constraints between the changeable predictor variables. The data constraints include dependencies between the changeable predictor variables. In one embodiment, the automated system 104 extends a code generated extract, transform, load (ETL) tool with a Model Manager to capture metadata for generating a predictive model. The Model Manager is a computerized module to capture the predictive model metadata for building machine learning models and deploying the predictive model in production. In one embodiment, the metadata includes a technical library on which the predictive model is to be created, training data on which the predictive model is to be trained, a machine learning algorithm that is used for generating the predictive model, hyperparameters and their values for the machine learning algorithm and algorithm scripts for customizing the predictive model. In one embodiment, the ETL tool allows the predictive model to have multiple versions and the predictive models may be automatically retrained when required. For generating the predictive model, data scientists may provide training and test data files, and the algorithm file is code generated from a template. The algorithm file, upon execution, generates model binary, model summary, feature insights, model plots and prediction (CSV) files. At run time, the generated predictive model is used for scoring.

The automated system 104 code generates extended ETL jobs, using code generation process to incorporate scoring for an input record using the predictive model. In one embodiment, to enable that model metadata is promoted from the design time environment to the production environment, existing ETL packages loading data into a warehouse are updated using the code generation process to incorporate scoring using the specified predictive model. The source for the input records for scoring is provided as part of the code generated ETL jobs. Inputs for scoring includes which version of the predictive model to use, where to get the incremental data to score and where to write the predicted data are specified as part of the code generation process.

In one embodiment, once the ETL packages have been updated for scoring, the batch processing job which is used to load data into the warehouse may additionally score each incremental record using the predictive model specified and store the results of the prediction (e.g. predictive outcomes) along with a pointer to the predictive model used for scoring. In an embodiment, existing data warehouse based reports and dashboards are augmented to include the predictions, so the predicted scores are accessible to an end user.

The automated system 104 rescores, using the predictive model, a plurality of predictive outcomes for the input record by using a combination of different values of the changeable predictor variables while honoring constraints between the changeable predictor variables. The automated system 104 selectively categorizes the values of the changeable predictor variables into a plurality of buckets matching the predicted variable buckets based on the plurality of predictive outcomes to reduce a number of value combinations to be tried by analyzing only one value per bucket instead of trying every possible value, for efficiency in coming up with predictor variable values for an improved predictive outcome. In one embodiment, the values of the changeable predictor variables are categorized into a plurality of buckets matching the predicted variable buckets based on the plurality of actual outcomes by looking into historical data.

The automated system 104 automatically recommends appropriate predictor variable values for the changeable predictor variables for improving a predictive outcome by computing predictive outcomes for each input record during a batch ETL process and determining appropriate predictor variable values that lead to improved predictive outcomes, using the code generated extended ETL jobs updated to perform said rescoring, or by enabling an end user to perform said rescoring by changing values of the changeable predictor variables on the fly to determine most suitable predictor variable values that lead to improved predictive outcomes.

In one embodiment, during a regular batch ETL, scoring information on predictor variables that are changeable and constraints or dependencies between the changeable predictor variables are obtained from a customer and recorded using the Model Manager. For on the fly scoring, information on changeable predictor variables and constraints between them is optional, since, the end user performing the dynamic analysis may be aware of changeable predictor variables and constraints between them.

In one embodiment, during the regular batch ETL, scoring a prescriptive recommendation is provided to improve the predictive probabilities which are computed at the time of the regular batch ETL run based on changing different combination of values for the changeable predictor variables. In the prescriptive recommendation-based approach categorization of the changeable predictor variable values into buckets is required, whereas for on the fly scoring, bucketing is optional as the end user performing dynamic analysis may know appropriate values to try.

In an embodiment, the processor 106 is further configured to update a computer-generated electronic report or a dashboard in a computer user interface (UI) to include the predictive outcomes.

In an embodiment, the processor 106 is configured to eliminate, on the fly, a negative changeable predictor variable that leads to a degradation of the predictive outcome. The processor 106 is configured to rescore, using the predictive model, a new predictive outcome with safe values for the negative changeable predictor variable as an approximation to nullify the degradation of the predictive outcome due to that negative changeable predictor variable on the new predictive outcome. The safe values are predictor variable values in a bucket corresponding to the best predicted variable value bucket.

In another embodiment, the processor 106 is further configured to pre-generate a plurality of predictive models with different combinations of the changeable predictor variables prior to scoring. The processor 106 is configured to determine, from the plurality of predictive models, a matching predictive model if one exists after eliminating the negative changeable predictor variable, and rescore using the matched predictive model to obtain a new predictive outcome for the input record.

In yet another embodiment, the processor 106 is configured to determine, from the plurality of predictive models, a predictive model that includes a maximum number of predictor variables as provided in the customer inputs if the matching predictive model does not exist after eliminating the negative changeable predictor variable. This may be handled by matching the variables left in the model after eliminating the undesired variable (preferred set) with the variables of the prebuilt models using set equality tests. The prebuilt model with the set of variables closest to the one desired is selected (either an exact match or one with the fewest differences from the preferred set). The processor 106 is configured to approximate, using the predictive model that includes a maximum number of predictor variables as provided in the customer inputs, by substituting the safe values for the negative changeable predictor variable and rescore on the fly, to obtain a new predictive outcome for the input record.

In yet another embodiment, the processor 106 is configured to generate a new predictive model based on the metadata of a predictive model that includes a maximum number of predictor variables as provided in the customer inputs, if a matching predictive model does not exist after eliminating the negative changeable predictor variable, and rescore, using the new predictive model, to obtain a new predictive outcome.

In yet another embodiment, the processor 106 is configured to automatically update code generated extended ETL jobs to determine (i) a predictive model to be used for scoring, (ii) the data system from which the incremental data associated with the input record needs to be obtained, and (iii) data repository feeding reports and dashboards at which the predictive outcome has to be stored.

In an exemplary embodiment, predicting a change failure probability in IT Service Management (ITSM) systems is considered. In ITSM systems, Incident is defined as an unplanned interruption to a service, a reduction in the quality of a service or an event that has not yet impacted the service to the customer, Problem is the root cause of related Incidents, and Change is a way to resolve a Problem. Changes are typically done to resolve Incidents and Problems but may be the cause of new Incidents as well. Change failure probability predicts the likelihood of Changes failing and causing new Incidents. With the aid of a system such as the one described in U.S. patent application Ser. No. 15/992,992, the complete disclosure of which in its entirety is herein incorporated by reference, entitled "Aids for porting predictive models across tenants and handling impact of source changes on predictive models" a model is developed for predicting change failure with variables Type, Impact, configuration item (CI) Class, Start Time & Assignment Group identified as potential risk factors for Change failure. FIG. 1B, with reference to FIG. 1A, illustrates a table that shows some example change records scored using the predictive model as part of a batch scoring ETL process as described previously. The value of the risk factors is shown and based on the predicted scores/outcomes, the Changes are bucketed into 4 different Risk categories {Low<5%, Low-Med 5-25%, Med-High 25-50%, High>50%}.

The risk level associated with individual enumerated values for each risk factors are ascertained by looking at actual outcomes and a percentage of failures for each enumerated value for each variable.

In the exemplary embodiment, the end user on the fly changes the value of considered variables (i.e. risk factors) to see the impact on the predictive outcome (e.g. failure probability) for a particular record (e.g. change record). For example, the end user may schedule the change at different time or reassign the change to a different group. The projected impact on failure probability may allow the end user to decide whether to reschedule or reassign the change.

In another exemplary embodiment, the predicted failure probability may be high due to an issue which the end user knows to have been resolved. For example, the CI Class being an Oracle® Server may be contributing to high failure probabilities given past issues with Oracle® Server, but those issues may have been identified and recently fixed but not incorporated in the predictive model as model retraining is not continuous and it anyway takes a while for recent outcomes to influence a model's predictions. So, the end user may want an updated probability score discounting the CI Class being "Oracle® Server" issue. One way to discount CI Class contribution is to switch "CI Class" to a "safe" CI class that doesn't contribute to high change failure probabilities based on enumerated value risk levels (e.g. "Application") and then rescore.

In another exemplary embodiment, the on the fly scoring feature may be surfaced in the ITSM product user interface (UI) if predictions are embedded, or in Business Intelligence (BI) tool UI if predictions are surfaced in dashboards, or in a standalone tool created for Rescoring Analysis.

In the above exemplary embodiment, the system is described in the context of an ITSM Change Scoring scenario, but the approaches clearly generalize to any predictions as long as what's considered an "improvement" for predicted values (i.e., their going up or down) is known, for example, in case of Change failure probability the predicted failure probability going down is considered an improvement. If the predicted value is bucketed into different categories; e.g., risk categories in case of Change failure probability example, then changeable predictor variable values are range partitioned into the same buckets based on the actual outcome vis-a-vis the predictor variable values so that Rescoring analysis can be done efficiently by looking at only one value per bucket. As for "Safe" values, in the general case they are predictor variables values in the bucket corresponding to the best predicted value bucket.

The embodiments herein provided generalizes to any predictions in other domains such as IT Asset Analytics, IT Project Analytics, and IT Contact Center Analytics etc. As described in the context of the ITSM Change Scoring scenario, the current system recommends suitable predictor variable values for the changeable predictor variables for improving predictive outcomes in each case such as predictions for Asset lifetimes, Project Completion times, Contact Center first response times etc. The predictive model and the predictor variables are naturally domain specific.

In an embodiment, the relative contribution of different changeable predictor variables to the predicted outcomes of the predictive machine learning model is identified based on a type of the underlying predictive machine learning model. For linear and regression model, the regression coefficients are standardized such that the similar changeable predictor variables use the same scale. With standardized regression coefficients, the ratio of the changeable predictor variable coefficients represents their relative contribution to the predictive outcome. The regression coefficients are standardized by standardizing the observed values of each independent variables first and then the predictive machine learning model is built using the standardized independent changeable predictor variables. Standardizing the independent changeable predictor variables involves subtracting the variable's mean from each observed value and then dividing by the variable's standard deviation. For Decision trees (Classification And Regression Tree (CART)), an improvement measure attributable to each variable in its role as either a primary or a surrogate splitter is identified. The primary splitter is the main variable in a decision tree. If the main variable is missing, surrogate splitters are used to estimate the values of predictor variables with missing values. The best performing changeable predictor variable is identified based on ordering by the sum of all improvements over each node. For relative contribution, the values are scaled relative to the best value. The variable contributions in CART are specific to a tree and are reevaluated if the tree changes. Instead of trying every possible value only one value per bucket has to be tried, thereby reducing computer processor requirements (time, resources, etc.) and memory allocation (space, retrieval, etc.), which improves the overall functioning of the underlying computer system.

In an embodiment, supporting on the fly scoring using the extended code generated ETL Platform involves invoking a scoring application programming interface (API) on the same version of the predictive model and the same input record but with one or a set of the different predictor variable values. The predictive model, version and input record information are available from the scored input record. Along with the scored input record, a pointer to the model used for scoring is provided. A versioned repository makes it easy to invoke the same version of the predictive model as used during the regular batch ETL time scoring to ensure consistency.

In an embodiment, if there are no data level security constraints, and if an end user may see the predictor values for an input record, the end user may also see predicted values for a variation of the values in the input record, hence rescoring doesn't require additional security checks. However, if data level security constraints exist, then before rescoring is invoked, a security check is performed to ensure that the variation of values for rescoring are within ranges allowed for the invoking the end user.

In an embodiment, the UI is configured to provide a conversational interface to (i) display the predictive outcome obtained by performing scoring analysis based on the predictor variables, (ii) display the predictor variables used for generating the predictive outcome with values that were used for scoring to obtain the predictive outcome, (iii) display a contribution percentage of the predictor variables to the predictive outcome, (iv) provide dropdown menu selections below the changeable predictor variables with a list of possible values and a data entry type-in option to enable a user to provide values for continuous predictor variables, (v) provide a special dropdown value of Ignore below the changeable predictor variables to ignore a changeable predictor variable, (vi) display bucket categories below each changeable predictor variable, wherein values of each changeable predictor variables are selectively categorized into a plurality of buckets matching the predicted variable buckets based on the plurality of predictive outcomes to reduce a number of value combinations to be tried for recommending values for the predictor variables, (vii) enforce constraints across the changeable predictor variables so, when a value is selected for a set of changeable predictor variables only values allowed based on the constraints are settable for other changeable predictor variables, (viii) enforce data security in predictor variable value specification if applicable, (ix) display a rescore button, when the end user selects a different value for the changeable predictor variable than that used in the current prediction and enable the user to do rescoring, and (x) display a rebuild and rescore button for rebuilding a new matching predictive model and rescoring using the new matching predictive model for improved analysis, when the rescore results are an approximation using a safe value substitution from a predictive model that includes a maximum number of predictor variables as provided in the customer inputs, wherein the safe values are predictor variable values in a bucket corresponding to the best predicted variable value bucket.

The embodiments herein add intelligence to predictive systems (e.g. a computing system) and improve the computer function by suggesting combination of predictor variable values that lead to improved predictive outcomes. Existing system that do not have this intelligence may have to run multiple iterations (which requires increased processing times, resources and storage/memory) in order to improve the predictive outcomes. Thus, the embodiments herein overcome the above-mentioned inefficiencies resulting in improved computer operations.

Existing BI systems do not focus on suggesting suitable values for changeable predictor variables to achieve improved predictive outcomes by the computer systems. Accordingly, the embodiments herein provide both a batch and dynamic analysis mode for determining suitable variable values for improved predictive outcomes. The batch mode only requires the upfront information of a list of changeable predictor variables and constraints between them and the suitable values are suggested automatically. The dynamic mode allows the BI users to perform rescoring on the fly using their knowledge to establish suitable variable values. Also, the conventional systems do not support the elimination of contribution of a predictor variable on the fly. The embodiments herein support the elimination of the contribution of a predictor variable by safe value substitution for a real time approximate response, by prebuilding multiple models and switching to a model without the variable for a real time response, or by building a model with just the desired variables automatically by obtaining all the required information from the closest model that the system is customizing. All three techniques are not supported by existing tools.

Figure 2:
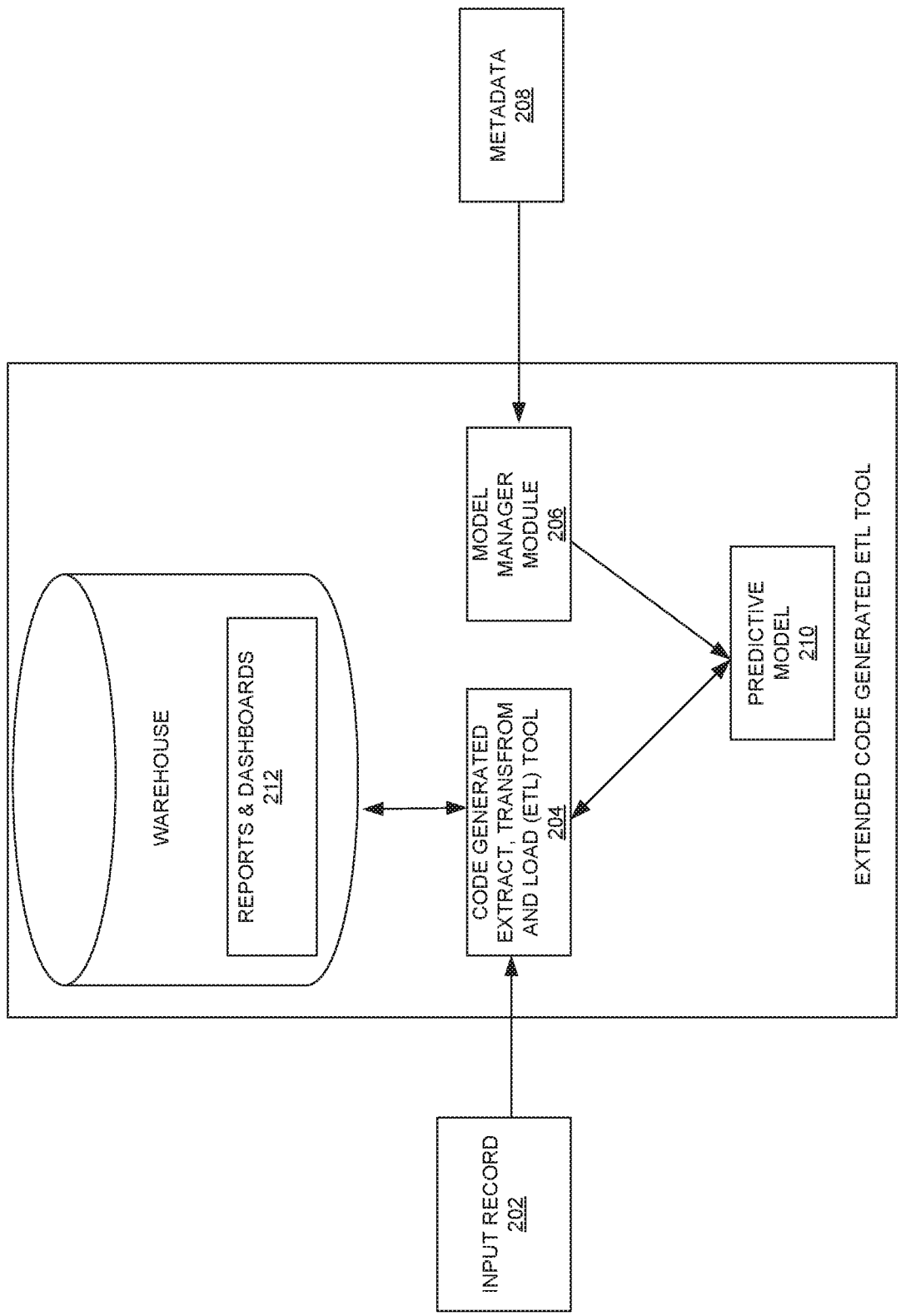
FIG. 2 illustrates a functional block diagram of the extended code generated ETL tool according to an embodiment herein.

FIG. 2, with reference to FIGS. 1A and 1B, illustrates a functional block diagram of the extended code generated ETL tool according to an embodiment herein. A code generated ETL tool 204 (e.g. such as the one described in U.S. Pat. No. 10,049,142, the complete disclosure of which in its entirety is herein incorporated by reference, entitled "Multi-step code generation for bi processes") is extended with a Model Manager module 206. The Model Manager module 206 is configured to capture metadata for generating the predictive model 210. The extended code generated ETL job obtains input record 202 and updates the input record 202 in computer-generated electronic reports or dashboards by invoking the predictive model 210 to incorporate scoring on the input record 202. Then, the extended code generated ETL job updates the computer-generated electronic reports or dashboard with the predictive outcome. In an embodiment, the metadata 208 includes a computerized technical library on which the predictive model is to be created, training data on which the predictive model is to be trained, a machine learning algorithm that is used for generating the predictive model, hyperparameters and their values for the machine learning algorithm and algorithm scripts for customizing the predictive model. The extended code generated ETL job remembers a predictive model and a version of the predictive model that is used while scoring so that information can be used while performing rescoring.

Figure 3:
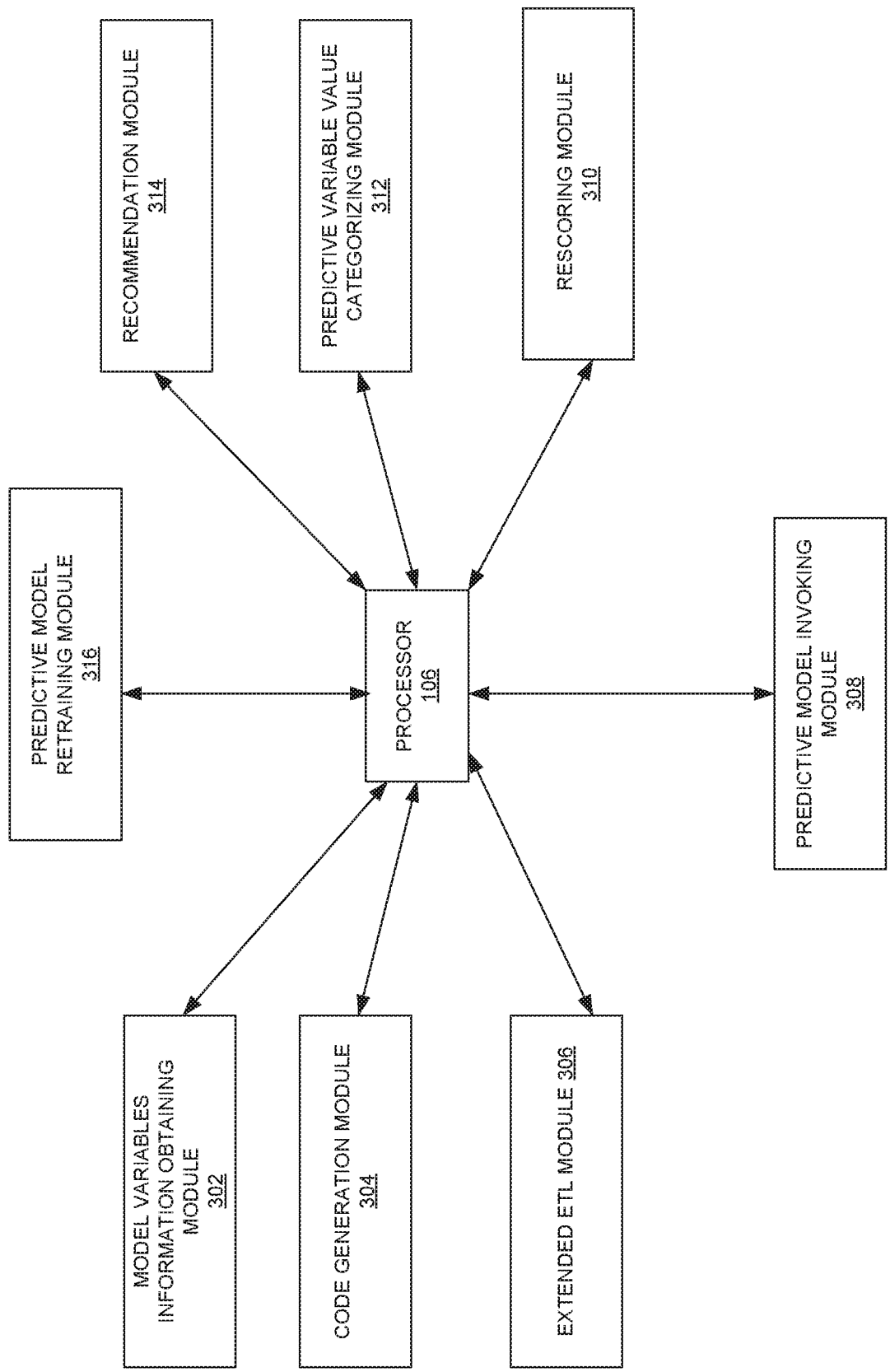
FIG. 3 illustrates an exploded view of a processor of the automated system of FIG. 1 according to an embodiment herein.

FIG. 3, with reference to FIGS. 1A through 2, illustrates an exploded view of the processor 106 of the automated system 104 of FIG. 1 according to an embodiment herein. The processor 106 includes a model variable information obtaining module 302, a code generation module 304, an extended ETL module 306, a predictive model invoking module 308, a rescoring module 310, a predictive variable value categorizing module 312, a recommendation module 314, and a predictive model retraining module 316.

The model variables information obtaining module 302 obtains customer inputs on the predictive model variables comprising a list of predictor variables that are changeable and data constraints between the changeable predictor variables. The extended ETL module 306 extends the code generated ETL tool with a Model Manager to generate a predictive model. The Model Manager is a computerized module to capture the predictive model metadata for building machine learning models and deploying the predictive models in production. The code generation module 304 generates an extended ETL job to include scoring using information collected by the Model Manager and a code generation process. The predictive model invoking module 308 invokes the predictive model for scoring an input record with model variables to generate a predictive outcome. The rescoring module 310 invokes the same predictive model to rescore the input record by using a combination of different values of the changeable predictor variables while honoring constraints between the changeable predictor variables. The predictive variable value categorizing module 312 categorizes the values of the changeable predictor variables into a plurality of buckets matching the predicted variable buckets based on the plurality of predictive outcomes to reduce a number of value combinations to be tried by analyzing only one value per bucket instead of trying every possible value for efficiency in coming up with variable values for an improved predictive outcome. The recommendation module 314 recommends appropriate predictor variable values for the changeable predictor variables for improving a predictive outcome by computing predictive outcomes for each input record during a batch ETL process and determining appropriate predictor variable values that lead to improved predictive outcomes, using the code generated extended ETL jobs updated to perform said rescoring, or enables an end user to perform said rescoring by changing values of the changeable predictor variables on the fly to determine most suitable predictor variable values that lead to improved predictive outcomes. The predictive model retraining module 316 retrains the predictive model as needed.

Figure 4:
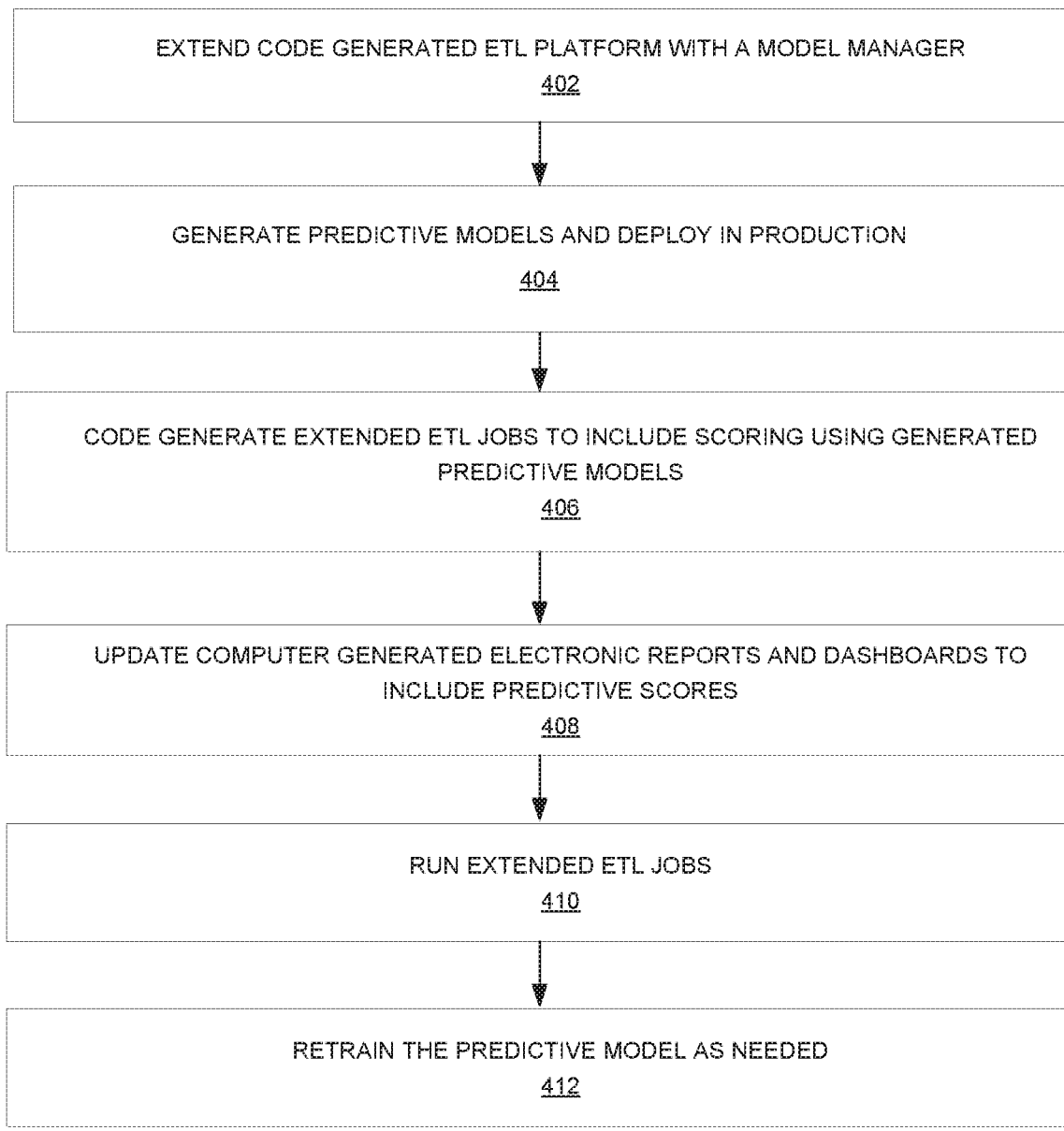
FIG. 4 is a flowchart that illustrates a batch scoring approach using code generated ETL according to an embodiment herein.

FIG. 4, with reference to FIGS. 1A through 3, is a flowchart that illustrates a batch scoring approach using a code generated ETL tool according to an embodiment herein. At step 402, the code generated ETL tool is extended with a Model Manager. The Model Manager is a computerized module to capture the predictive model metadata for building machine learning models and deploying the predictive models in production. At step 404, a predictive model is generated and deployed for production. At step 406, extended ETL jobs are code generated, using a code generation process, to incorporate scoring using the predictive model. At step 408, the predictive scores are updated in reports and dashboards. At step 410, the extended ETL jobs are run. At step 412, the predictive model is retrained, optionally.

Figure 5:
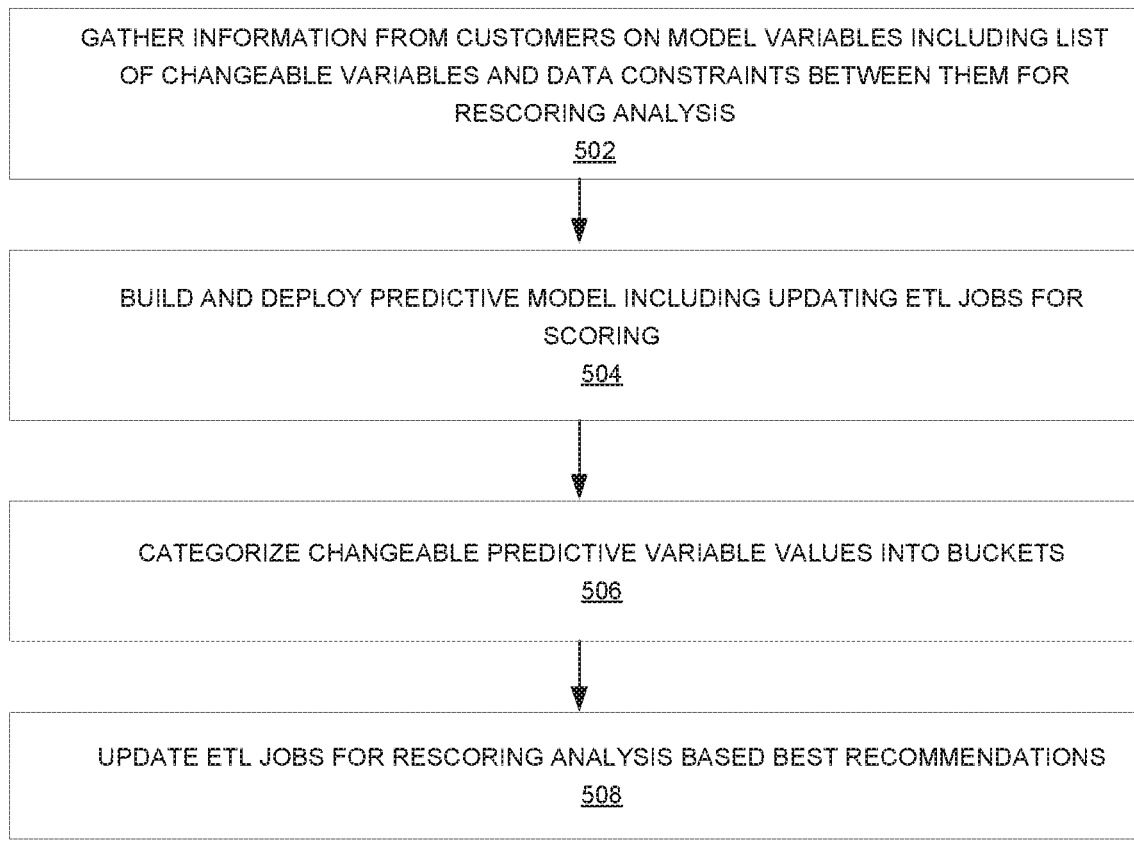
FIG. 5 is a flowchart that illustrates an approach for improving predictive outcomes according to an embodiment herein.

FIG. 5, with reference to FIGS. 1A through 4, is a flowchart that illustrates a prescriptive best recommendation approach for improving predictive outcomes according to an embodiment herein. At step 502, information on model variables including a list of changeable predictor variables and data constraints between them are gathered from a customer for Rescoring analysis. At step 504, a predictive model for scoring is generated and deployed for production and relevant ETL jobs are updated to include scoring using the predictive model. At step 506, changeable predictor variables are categorized into buckets matching the predicted variable buckets based on the plurality of predictive outcomes. At step 508, the ETL jobs are updated for rescoring analysis with a set of changeable predictor variable values to analyze the impact on predictive outcome.

Figure 6:
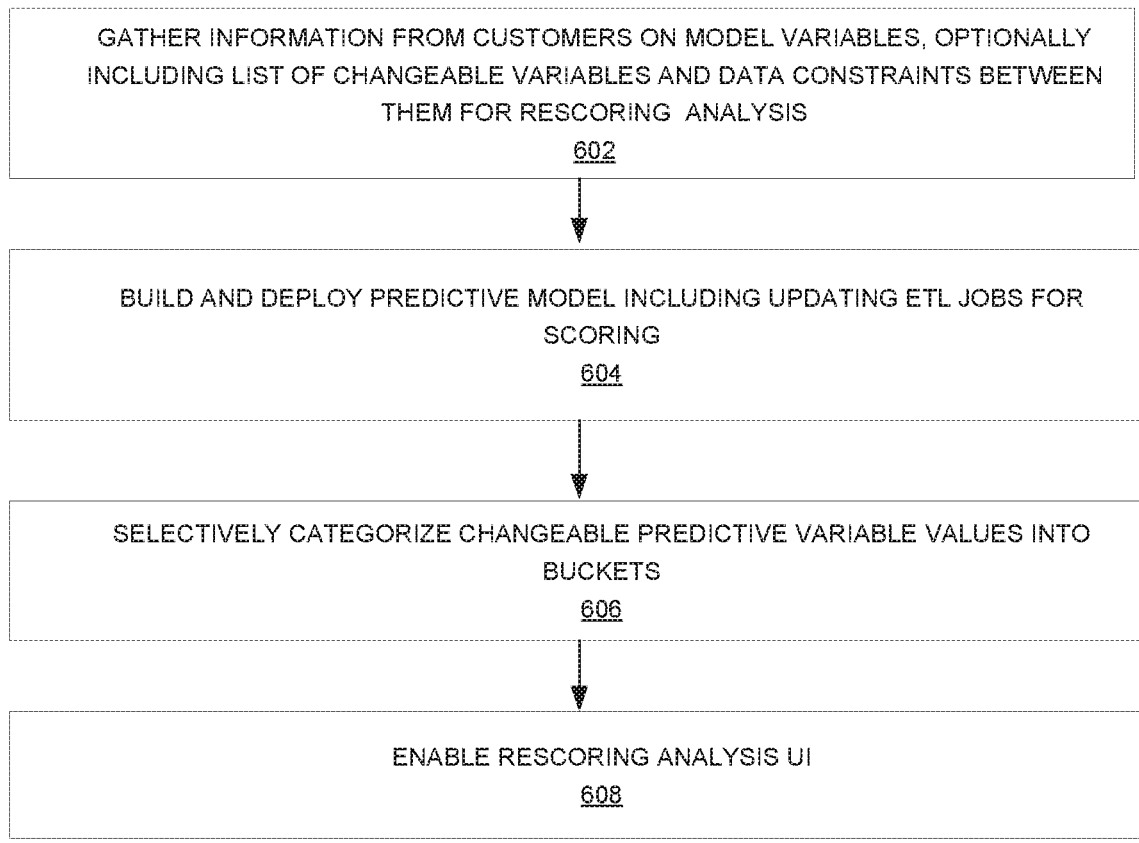
FIG. 6 is a flowchart that illustrates on the fly scoring approach using code generated ETL for improving predictive outcomes according to an embodiment herein.

FIG. 6, with reference to FIGS. 1A through 5, is a flowchart that illustrates on the fly scoring approach using a code generated ETL tool for improving predictive outcomes according to an embodiment herein. At step 602, information on model variables, optionally including a list of changeable predictor variables and data constraints between them, is gathered from a customer. At step 604, a predictive model for scoring is generated and deployed for production and relevant ETL jobs are updated to include scoring using the predictive model. At step 606, changeable predictor variables values are optionally categorized into buckets matching the predicted variable buckets based on the plurality of predictive outcomes. At step 608, Rescoring on the fly UI is enabled.

Figure 7:
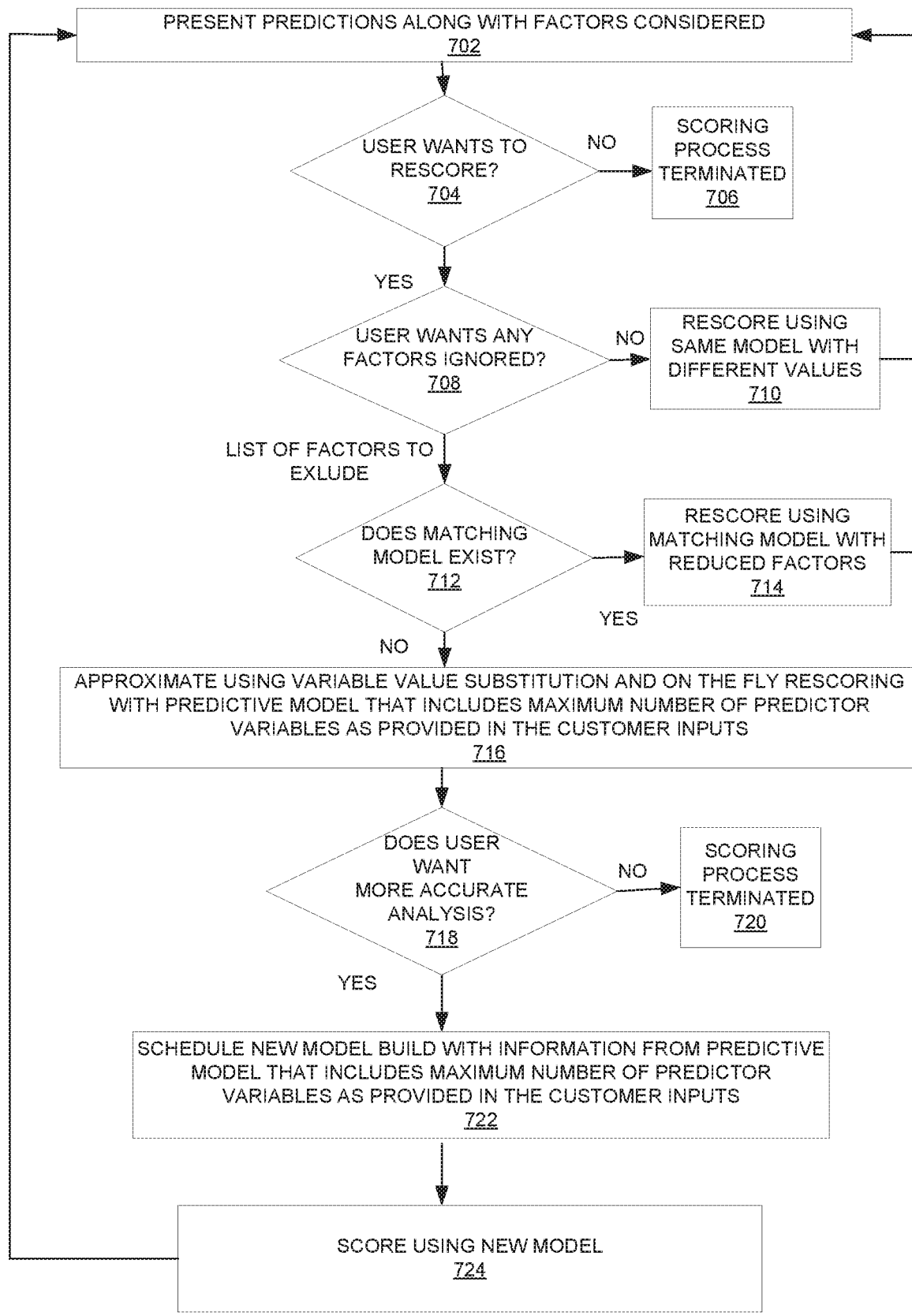
FIG. 7 is a flowchart that illustrates elimination of a changeable predictor variable that is negatively contributing to a predictive outcome according to an embodiment herein.

FIG. 7, with reference to FIGS. 1A through 6, is a flowchart that illustrates elimination of a changeable predictor variable that is negatively contributing to a predictive outcome according to an embodiment herein. At step 702, the predictive outcomes for input records are presented along with predictor variables considered for prediction. At step 704, a user decides whether to rescore the input records using a combination of different values of the changeable predictor variables or not. If NO, at step 706, the scoring process is terminated. If YES, at step 708, the user decides whether any predictor variable needs to be ignored or not. If NO, at step 710, rescoring is performed using the same predictive model by substituting the different values for the changeable predictor variable and the predictive outcome is presented along with predictor variable value considered. If YES, at step 712, it is checked whether existing matching predictive model for rescoring the input record with excluded predictor variables is available. If the matching predictive model is available, rescoring is performed using the matching predictive model along with excluded predictor variables at step 714. If the matching predictive model is not available, a predictive model that includes a maximum number of predictor variables as provided in the customer inputs is used and elimination of the contribution of factors to exclude is approximated using variable value substitution and rescoring on the fly. At step 718, the user decides whether a more accurate result is required or not. If NO, the scoring process is terminated at step 720. If YES, at step 722, a new predictive model with just the desired variables is generated using the information from the predictive model that includes a maximum number of predictor variables as provided in the customer inputs. At step 724, scoring is performed using the new predictive model and predictive outcome is presented.

Figure 8:
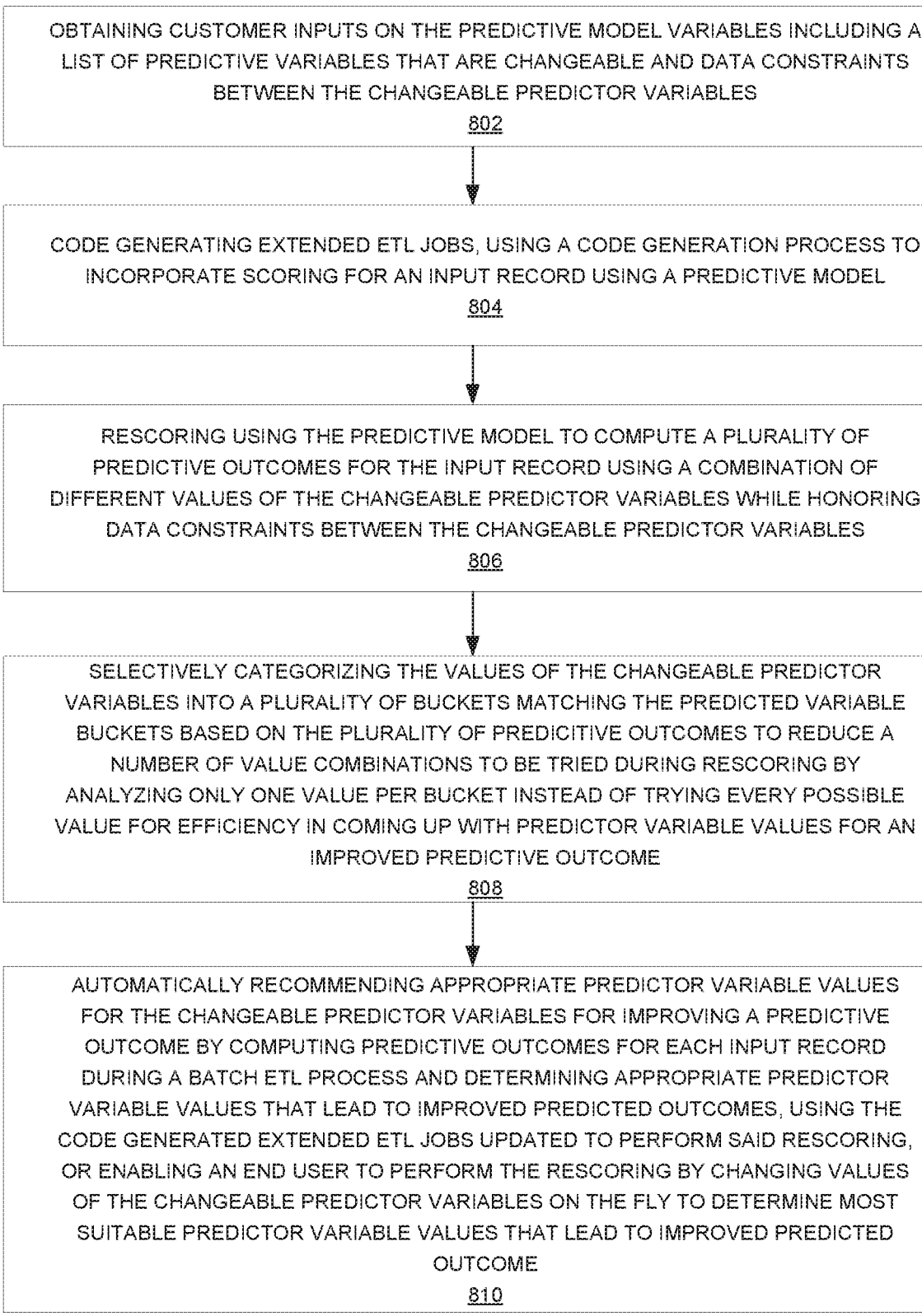
FIG. 8 is a flowchart that illustrates a method for recommending predictor variable values for improving predictive outcomes of a predictive model according to an embodiment herein.

FIG. 8, with reference to FIGS. 1A through 7, is a flowchart that illustrates a method for recommending predictor variable values for improving predictive outcomes of a predictive model according to an embodiment herein. At step 802, customer inputs on the predictive model variables including a list of predictive variables that are changeable and data constraints between the changeable predictor variables are obtained. At step 804, extended ETL jobs are code generated using a code generation process to incorporate scoring for an input record using the predictive model. At step 806, rescoring using the predictive model is performed to compute a plurality of predictive outcomes for the input record with a combination of different values of the changeable predictor variables while honoring constraints between the changeable predictor variables. At step 808, the values of the changeable predictor variables are selectively categorized into a plurality of buckets matching the predicted variable buckets based on the plurality of predictive outcomes to reduce a number of value combinations to be tried during rescoring by analyzing only one value per bucket instead of trying every possible value for efficiency in coming up with predictor variable values for an improved predictive outcome. At step 810, appropriate predictor variable values for the changeable predictor variables are automatically recommended for improving a predictive outcome by computing predictive outcomes for each input record during a batch ETL process and determining appropriate predictor variable values that lead to improved predictive outcomes, using the code generated extended ETL jobs updated to perform said rescoring, or by enabling an end user to perform the rescoring by changing values of the changeable predictor variables on the fly to determine most suitable predictor variable values that lead to improved predictive outcomes.

The embodiments herein may comprise a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An automated system for recommending predictor variable values for improving predictive outcomes of a prebuilt predictive model, the system comprising:
   a memory that stores a set of instructions; and
   a processor that executes the set of instructions and is configured to:
   obtain customer inputs on predictive model variables comprising a list of predictor variables that are changeable in terms of corresponding values and data constraints between changeable predictor variables, wherein the data constraints comprise dependencies between the changeable predictor variables;
   automatically code generate extended extract, transform, load (ETL) jobs, using a code generation process, to incorporate scoring for an input record using the prebuilt predictive model, wherein a source for the input record for scoring is provided as part of the code generated ETL jobs;
   automatically rescore, using the prebuilt predictive model, a plurality of predictive outcomes for the input record by using a combination of different values of the changeable predictor variables other than values used for scoring the input record, while honoring constraints between the changeable predictor variables;
   automatically and selectively categorize the different values of the changeable predictor variables into a plurality of buckets matching predicted variable buckets based on the plurality of predictive outcomes to reduce a number of value combinations of the changeable predictor variables to be tried by analyzing only one value of the changeable predictor variables per bucket instead of trying every possible value of the changeable predictor variables for efficiency in coming up with predictor variable values for an improved predictive outcome during a subsequent rescoring; and
   automatically recommend, based on the categorized different values of the changeable predictor variables, appropriate predictor variable values for the changeable predictor variables for improving a predictive outcome by computing predictive outcomes, by the prebuilt predictive model, for each input record during a batch ETL process and determining appropriate predictor variable values from the categorized different values that lead to improved predictive outcomes, using the code generated extended ETL jobs updated to perform the subsequent rescoring for the batch ETL process.

2. The automated system of claim 1, wherein the processor is configured to extend the code generated ETL tool with a Model Manager to capture metadata for generating the prebuilt predictive model, wherein the metadata comprises a technical library on which the prebuilt predictive model is to be created, training data on which the prebuilt predictive model is to be trained, a machine learning algorithm that is used for generating the prebuilt predictive model, hyperparameters and their values for the machine learning algorithm, and algorithm scripts for customizing the prebuilt predictive model.

3. The automated system of claim 1, wherein the processor is configured to:
rescore, on the fly, using the prebuilt predictive model, a new predictive outcome with safe values for a negative changeable predictor variable as an approximation to nullify a degradation of the predictive outcome due to the negative changeable predictor variable on the new predictive outcome, wherein the safe values are predictor variable values in a bucket corresponding to a best predicted variable value bucket.

4. The automated system of claim 3, wherein the processor is configured to:
pre-generate a plurality of predictive models with different combinations of the changeable predictor variables prior to scoring; and
determine, from a plurality of pre-generated predictive models, a matching predictive model if one exists after eliminating any changeable predictor variables to be excluded, and rescore using the matched predictive model to obtain a new predictive outcome for the input record.

5. The automated system of claim 4, wherein the processor is configured to:
obtain the new predictive outcome for the input record, on the fly, by (i) using a pre-generated predictive model that comprises a maximum number of predictor variables as provided in the customer inputs, and by (ii) substituting the safe values for any changeable predictor variables to be excluded.

6. The automated system of claim 5, wherein the processor is configured to generate a new predictive model based on the metadata of the pre-generated predictive model that comprises a maximum number of predictor variables as provided in the customer inputs, if a matching predictive model does not exist after eliminating any changeable predictor variables to be excluded, and rescore, using the new predictive model, to obtain a new predictive outcome for the input record.

7. The automated system of claim 3, wherein the processor is configured to update a computer-generated electronic report or a dashboard in a computer user interface (UI) to include the predictive outcomes.

8. The automated system of claim 1, wherein the processor is configured to automatically update code generated extended ETL jobs to determine (i) a predictive model to be used for scoring, (ii) a data system from which incremental data associated with the input record needs to be obtained, and (iii) data repository feeding reports and dashboards at which the predictive outcome has to be stored.

9. The automated system of claim 7, wherein the UI is configured to provide an interface to:
display the predictive outcome obtained by performing scoring analysis based on the predictor variables;
display the predictor variables used for generating the predictive outcome with values that were used for scoring to obtain the predictive outcome;
display a contribution percentage of the predictor variables to the predictive outcome; and
enforce data security in a predictor variable value specification.

10. The automated system of claim 7, wherein the UI is further configured to provide a computerized conversational interface to:
provide dropdown menu selections below the changeable predictor variables with a list of possible values and a data entry type-in option to enable a user to provide values for continuous predictor variables;
provide a special dropdown value of Ignore below the changeable predictor variables to ignore a changeable predictor variable;
display bucket categories below each changeable predictor variable, wherein values of each changeable predictor variables are selectively categorized into a plurality of buckets matching the predicted variable buckets based on the plurality of predictive outcomes to reduce a number of value combinations to be tried for recommending values for the predictor variables;
enforce constraints across the changeable predictor variables so, when a value is selected for a set of changeable predictor variables, only values allowed based on the constraints are settable for other changeable predictor variables;
display a rescore button, when an end user selects a different value for the changeable predictor variable than that used in the current prediction and enable the end user to do rescoring; and
display a rebuild and rescore button for rebuilding a new matching predictive model and rescoring using the new matching predictive model for improved analysis, when the rescore results are an approximation using a safe value substitution from a predictive model that comprises a maximum number of predictor variables as provided in the customer inputs, wherein the safe values are predictor variable values in a bucket corresponding to the best predicted variable value bucket.

11. A non-transitory computer readable storage medium storing a sequence of instructions, which when executed by a processor, causes a recommendation of predictor variable values for improving predictive outcomes of a prebuilt predictive model, said sequence of instructions comprising:
obtaining customer inputs on predictive model variables comprising a list of predictor variables that are changeable in terms of corresponding values and data constraints between the changeable predictor variables, wherein the data constraints comprise dependencies between the changeable predictor variables;
automatically code generating extended extract, transform, load (ETL) jobs, using a code generation process, to incorporate scoring for an input record using the prebuilt predictive model, wherein a source for the input records for scoring is provided as part of the code generated ETL jobs;
automatically rescoring, using the prebuilt predictive model, a plurality of predictive outcomes for the input record by using a combination of different values of the changeable predictor variables other than values used for scoring the input record, while honoring constraints between the changeable predictor variables;
automatically selectively categorizing the different values of the changeable predictor variables into a plurality of buckets matching predicted variable buckets based on the plurality of predictive outcomes to reduce a number of value combinations of the changeable predictor variables to be tried by analyzing only one value of the changeable predictor variables per bucket instead of trying every possible value of the changeable predictor variables for efficiency in coming up with predictor variable values for an improved predictive outcome during a subsequent rescoring; and automatically recommending, based on the categorized different values of the changeable predictor variables, appropriate predictor variable values for the changeable predictor variables for improving a predictive outcome by computing predictive outcomes, by the prebuilt predictive model, for each input record during a batch ETL process and determining appropriate predictor variable values from the categorized different values that lead to improved predictive outcomes, using the code generated extended ETL jobs updated to perform the subsequent rescoring for the batch ETL process.

12. The non-transitory computer readable storage medium storing the sequence of instructions of claim 11, which when executed by said processor, further causes extension of the code generated ETL tool with a Model Manager to capture metadata for generating the prebuilt predictive model, wherein the metadata comprises a technical library on which the prebuilt predictive model is to be created, training data on which the prebuilt predictive model is to be trained, a machine learning algorithm that is used for generating the prebuilt predictive model, hyperparameters and their values for the machine learning algorithm and algorithm scripts for customizing the prebuilt predictive model.

13. The non-transitory computer readable storage medium storing the sequence of instructions of claim 11, which when executed by said processor, further causes:

rescoring, on the fly, using the prebuilt predictive model, to generate a new predictive outcome with safe values for a negative changeable predictor variable as an approximation to nullify a degradation of the predictive outcome due to the negative changeable predictor variable on the new predictive outcome, wherein the safe values are predictor variable values in a bucket corresponding to a best predicted variable value bucket.

14. The non-transitory computer readable storage medium storing the sequence of instructions of claim 13, which when executed by said processor, further causes:

pre-generation of a plurality of predictive models with different combinations of the changeable predictor variables prior to scoring; and determination, from a plurality of pre-generated predictive models, of a matching predictive model if one exists after eliminating any changeable predictor variables to be excluded, and rescoring using the matched predictive model to obtain a new predictive outcome for the input record.

15. The non-transitory computer readable storage medium storing the sequence of instructions of claim 14, which when executed by said processor, further causes:

obtaining the new predictive outcome for the input record, on the fly, by (i) using a pre-generated predictive model that comprises a maximum number of predictor variables as provided in the customer inputs, and by (ii) substituting the safe values for any changeable predictor variables not in the customer input.

16. The non-transitory computer readable storage medium storing the sequence of instructions of claim 14, which when executed by said processor, further causes generation of a new predictive model based on the metadata of the pre-generated predictive model that comprises a maximum number of predictor variables as provided in the customer inputs, if a matching predictive model does not exist after eliminating any changeable predictor variables to be excluded, and rescoring, using the new predictive model, to obtain a new predictive outcome for the input record.

17. The non-transitory computer readable storage medium storing the sequence of instructions of claim 11, which when executed by said processor, further causes updation of a computer-generated electronic report or a dashboard in a computer user interface (UI) to include the predictive outcomes.

18. The non-transitory computer readable storage medium storing the sequence of instructions of claim 11, which when executed by said processor, further causes automatic updation of code generated extended ETL jobs to determine (i) a prebuilt predictive model to be used for scoring, (ii) a data system from which incremental data associated with the input record needs to be obtained, and (iii) data repository feeding reports and dashboards at which the predictive outcome has to be stored.

19. The non-transitory computer readable storage medium storing the sequence of instructions of claim 17, wherein the UI is configured to provide an interface to:

display the predictive outcome obtained by performing scoring analysis based on the predictor variables;

display the predictor variables used for generating the predictive outcome with values that were used for scoring to obtain the predictive outcome;

display a contribution percentage of the predictor variables to the predictive outcome; and enforce data security in a predictor variable value specification.

20. The non-transitory computer readable storage medium storing the sequence of instructions of claim 17, wherein the UI is further configured to provide a computerized conversational interface to:

provide dropdown menu selections below the changeable predictor variables with a list of possible values and a data entry type-in option to enable a user to provide values for continuous predictor variables;

provide a special dropdown value of Ignore below the changeable predictor variables to ignore a changeable predictor variable;

display bucket categories below each changeable predictor variable, wherein values of each changeable predictor variables are selectively categorized into a plurality of buckets matching the predicted variable buckets based on the plurality of predictive outcomes to reduce a number of value combinations to be tried for recommending values for the predictor variables;

enforce constraints across the changeable predictor variables so, when a value is selected for a set of changeable predictor variables only values allowed based on the constraints are settable for other changeable predictor variables;

display a rescore button, when an end user selects a different value for the changeable predictor variable than that used in the current prediction and enable the user to do rescoring; and display a rebuild and rescore button for rebuilding a new matching predictive model and rescoring using the new matching predictive model for improved analysis, when the rescore results are an approximation using a safe value substitution from a predictive model that comprises a maximum number of predictor variables as provided in the customer inputs, wherein the safe values are predictor variable values in a bucket corresponding to the best predicted variable value bucket.

21. A method for recommending predictor variable values for improving predictive outcomes of a prebuilt predictive model, wherein the method comprises:

obtaining customer inputs on prebuilt predictive model variables comprising a list of predictor variables that are changeable in terms of corresponding values and data constraints between changeable predictor variables, wherein the data constraints comprise dependencies between the changeable predictor variables;

automatically code generating extended extract, transform, load (ETL) jobs, using a code generation process, to incorporate scoring for an input record using the prebuilt predictive model, wherein a source for the input records for scoring is provided as part of the code generated ETL jobs;

automatically rescoring, using the prebuilt predictive model, a plurality of predictive outcomes for the input record by using a combination of different values of the changeable predictor variables other than values used for scoring the input record, while honoring constraints between the changeable predictor variables;

automatically selectively categorizing the different values of the changeable predictor variables into a plurality of buckets matching predicted variable buckets based on the plurality of predictive outcomes to reduce a number of value combinations of the changeable predictor variables to be tried by analyzing only one value of the changeable predictor variables per bucket instead of trying every possible value of the changeable predictor variables for efficiency in coming up with predictor variable values for an improved predictive outcome during a subsequent rescoring; and automatically recommending, based on the categorized different values of the changeable predictor variables, appropriate predictor variable values for the changeable predictor variables for improving a predictive outcome by computing predictive outcomes, by the prebuilt predictive model, for each input record during a batch ETL process and determining appropriate predictor variable values from the categorized different values that lead to improved predictive outcomes, using the code generated extended ETL jobs updated to perform the subsequent rescoring for the batch ETL process.

* * * * *